United States Patent [19]

Kawano et al.

[11] 4,249,063
[45] Feb. 3, 1981

[54] CIRCUIT FOR HIGH FREQUENCY ARC WELDING APPARATUS USING A LOW FREQUENCY SWITCH

[75] Inventors: Hitoshi Kawano; Kiyoshi Ikemura; Mitsuhiro Hayashi, all of Ise, Japan

[73] Assignee: Shinko Electric Co., Ltd., Mie, Japan

[21] Appl. No.: 2,002

[22] Filed: Jan. 9, 1979

[30] Foreign Application Priority Data

Feb. 8, 1978 [JP] Japan .................................. 53-13890

[51] Int. Cl.³ .............................................. B23K 9/09
[52] U.S. Cl. ............................................. 219/130.51
[58] Field of Search ........... 219/130.51, 130.5, 130.32, 219/130.31, 137 PS

[56] References Cited
U.S. PATENT DOCUMENTS 4,046,987   9/1977   Hashimoto et al. ............ 219/130.32

*Primary Examiner*—C. C. Shaw
*Attorney, Agent, or Firm*—Oblon, Fisher, Spivak, McClelland & Maier

[57] ABSTRACT

A circuit for a high frequency arc welding apparatus which can control the welding current by keeping the peak value, that is the amplitude of the pulse component, of the welding current waveform constant and improve operating efficiency and reliability. The circuit includes a D.C. electrical source for welding and a condenser for regenerating. The welding current is controlled by controlling the voltage of the condenser. A low frequency switch periodically discharges the condenser to limit the voltage of the condenser and to transfer the stored energy of the condenser to the electrical source.

6 Claims, 6 Drawing Figures

1

CIRCUIT FOR HIGH FREQUENCY ARC WELDING APPARATUS USING A LOW FREQUENCY SWITCH

BACKGROUND OF THE INVENTION

1. Field of the Invention

This invention relates to a circuit for high frequency arc welding apparatus, and more particularly to a circuit in which the welding current is controlled by controlling the voltage of a condenser (or a D.C. electrical source) for regenerating the electrical energy stored in the inductance of the power circuit cables.

2. Description of the Prior Art

It is well known that as the high frequency pulse component of 10 KHz to 100 KHz involved in the welding current of a D.C. arc welding apparatus makes the stiffness and the stability of the arc increase, the welding characteristics can be improved and the welding speed accelerated.

The welding result is effected by the high frequency arc current as follows. The higher the frequency, the better the welding characteristics, and also the larger the ripple component involved, the better the welding characteristics.

A prior art high frequency arc welding apparatus is shown in FIGS. 1 and 2, in which FIG. 1 is the circuit diagram and FIG. 2 shows the waveform of the welding current obtained. In FIG. 1, 1 is a D.C. electrical source, 2 a cable, 3 a parent metal, 4 a transistor, 6 a cable, 7 an electrode, 8 arc, 9 a diode, 10 the control circuit for the transistor 4, 11 a resistor, 12 a transistor, 13 a resistor, 14 a current control circuit, 15 the control circuit for the transistor 12, 16 a diode, and 17 a shunt resistor for welding current detection. Initially, the transistors 14 and 12 are turned on at the same time by the control circuit 14 through the other control circuits 10 and 15. As the result, the welding current begins to flow as shown in FIG. 2 through the path 1-12-2-8-6-17-14-1. At the time t1, the transistor 4 is turned off by the control circuit 14, so that the current takes the path 12-2-8-6-17-9-12. Accordingly, the welding current gradually decreases with a small decelerating slope as shown in FIG. 2, because the cables 2 and 6 and other parts of the welding apparatus have some inevitable inductance. At the time t2, the transistor 12 is also turned off, so that the current takes the path 6-17-9-1-16-2. Accordingly, the welding current decreases rapidly as shown in FIG. 2, because the D.C. electrical source 1 is connected opposite to the current direction. During the operation of the apparatus, the frequency is generally kept constant.

It would seem that the welding characteristics would be better than in other conventional welding apparatuses, because the mean value of the welding current can be controlled by controlling the interval t1 to t2, keeping the peak value Ip (amplitude of the pulse component) of the welding current waveform constant. However, the operating efficiency and reliability of the apparatus are worse than for other conventional welding apparatuses because the two high frequency switches 4 and 12, which are complicated and have many parts, are connected in series to each other in the welding circuit.

SUMMARY OF THE INVENTION

Accordingly, one object of this invention is to provide a novel circuit for a high frequency arc welding apparatus permitting more efficient and reliable operation.

Welding is accomplished by means of on-off-operation of a high frequency switch (HS) in a closed circuit which consists of a D.C. electrical source (E1) for welding, a welding machine (AL), and the high frequency switch (HS) for welding. The electrical energy temporarily stored in the inductance of the welding cables while closing the high frequency switch (HS) is transferred to a condenser (C) by means of the turn-off operation of the switch (HS) through the closed circuit consisting of the electrical source (E1), the welding machine (AL), a rectifier (D1), and a condenser (C) (or another D.C. electrical source (E2)). The electrical energy stored in the condenser (C) is regenerated in the electrical source (E1) by closing a switch (LS) for regenerating through the closed circuit consisting of the condenser (C), the switch (LS) for regenerating, an inductor (L), and the electrical source (E1). The electrical energy temporarily stored in the inductor (L) is also regenerated in the electrical source (E1) by means of the turn-off operation of the switch (LS) through the closed circuit consisting of the inductor (L), the electrical source (E1), and another rectifier (D2). The mean value of the welding current can be controlled by changing the voltage of the condenser (C) by means of the on-off-operation of the switch (LS) for regenerating.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
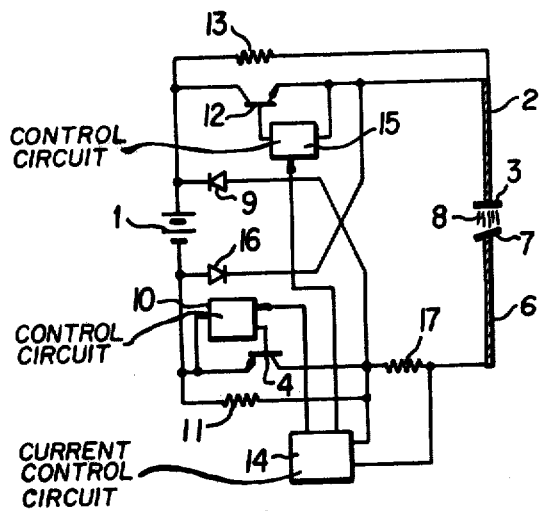
FIG. 1 is the circuit diagram of a high frequency arc welding apparatus of the prior art.
Figure 2:
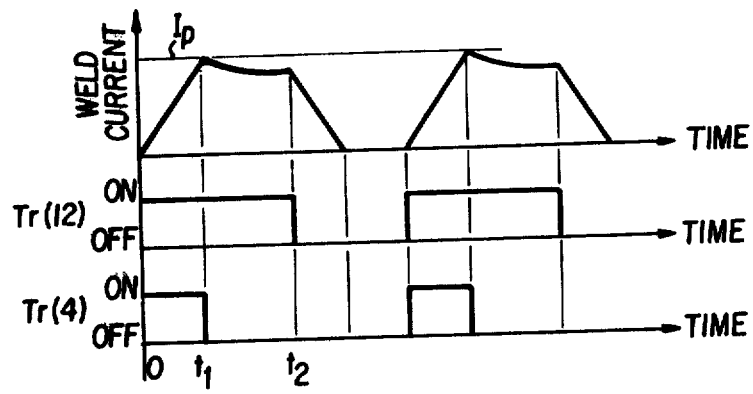
FIG. 2 shows the operation of the transistors and a waveform of the welding circuit obtained in the circuit diagram of FIG. 1.
Figure 3:
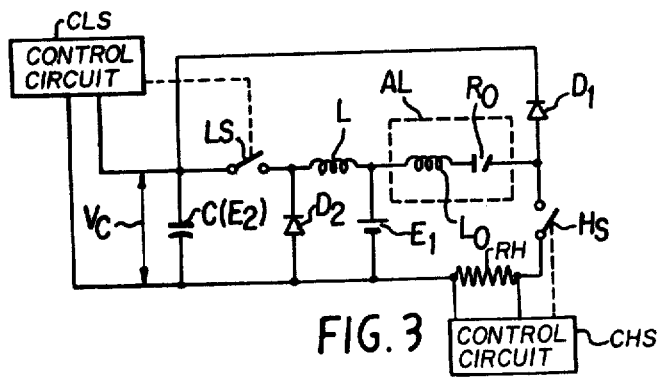
FIG. 3 is a circuit diagram of an embodiment of the circuit for the high frequency arc welding apparatus in accordance with the invention.

Referring now to the drawings, in FIG. 3, E1 is a D.C. electrical source for welding whose voltage is $V_{E1}$; AL is a welding machine including the arc-load-resistance RO and the inductance LO caused by the wires and the like of the machine; HS is a high frequency switch for welding; C is a condenser for regenerating (which can be replaced by a D.C. electrical source); LS is a switch for regenerating, L is an inductor, D1 and D2 are rectifiers, and Vc is the voltage of the condenser C.

Figure 4:
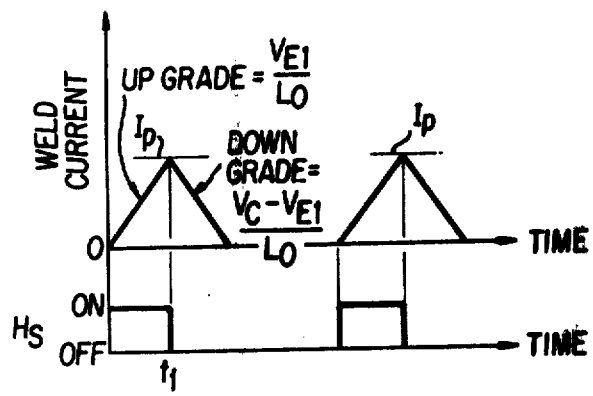
FIG. 4 shows the operation of the switch HS and a waveform of the welding current obtained in the circuit diagram of FIG. 3.

Initially, with the switch HS closed, the welding current starts flowing in the closed circuit, E1-LO-RO-HS-E1 and increases with an upgrade $V_{E1}/LO$ as shown in FIG. 4. The welding current is measured by a control circuit, CHS, across shunt resistor, RH. The switch, HS, is opened by the control circuit when the welding current reaches a predetermined value, Ip. As a result, the electrical energy temporarily stored in the inductance LO is transferred to the condenser C by means of the closed circuit, LO-RO-D1-C-E-LO. And, provided that the voltage Vc of the condenser C is higher than the voltage $V_{E1}$ of the electrical source E1, the difference $Vc - V_{E1}$ between Vc and $V_{E1}$ acts against the welding current, so that the welding current rapidly decreases in a straight line with a downgrade $(Vc - V_{E1})/LO$ as shown in FIG. 4. This downgrade is determined by the voltage value Vc of the condenser C. If on-off operation of the switch HS is continued, the voltage Vc of the condenser C gets higher and higher because the condenser is charged without discharging. Therefore, it is necessary to discharge the electrical energy of the condenser transferred from the inductance LO in order to keep the voltage Vc constant. This discharging is accomplished by the on-off-operation of the switch LS for regenerating. A control circuit CLS measures the voltage Ec across the condenser C and opens or closes switch LS in order to keep the voltage constant. With the switch LS closed, the regenerating current flows from the condenser C to the electrical source E1 by means of the closed circuit, C-LS-L-E-C, and after this, with the switch LS opened, the electrical energy temporarily stored in the inductor L is also regenerated in the electrical source E1 by the closed circuit, L-E-D2-L.

Figure 5:
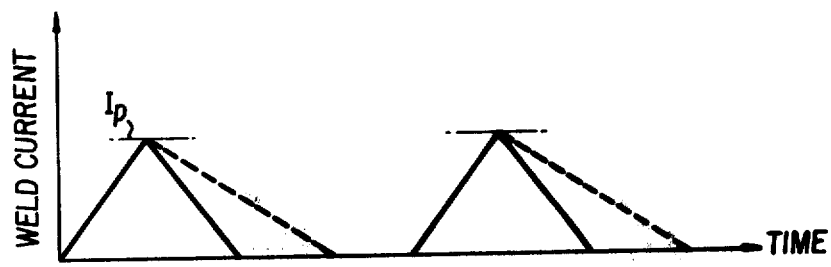
FIG. 5 shows a waveform of the welding current having a larger mean value than in FIG. 4.
Figure 6:
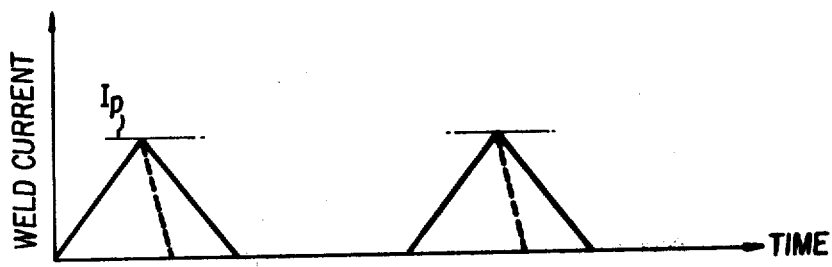
FIG. 6 shows a waveform of the welding current having a smaller mean value than in FIG. 4.

Accordingly, the voltage Vc of the condenser can be kept at a suitable constant value by controlling the on-off-operation, more specifically the on-off-time ratio of the switch LS. That is, if the on-off-time ratio, on-time/off-time, of the switch LS is controlled to be larger, the voltage Vc of the condenser C gets lower and the downgrade of the welding current waveform smaller as shown in a broken line in FIG. 5. As the result, the mean value of the welding current gets larger to weld in the best condition, keeping the peak value Ip (amplitude of the pulse component) of the welding current waveform constant. While, if the on-off-time ratio, on-time/off-time is controlled to be smaller, the voltage Vc gets higher and the downgrade of the welding current waveform smaller as shown in the broken line in FIG. 6. As the result, the mean value of the welding current gets smaller to weld in the best condition, keeping the peak value Ip (amplitude of the pulse component) of the welding current waveform constant. Accordingly, the operating efficiency gets better because only one high frequency switch HS is connected in series in the welding circuit, $E_1$-LO-RO-HS-$E_1$. Moreover, if the capacity of the condenser C is large enough to neglect the voltage ripple of the condenser C, the frequency of the switch LS can be lowered within the range permitted from the voltage ripple allowance of Vc. Accordingly, using a low frequency switch, which is not complicated and does not have many parts compared with a high frequency switch, as the switch LS, improves the reliability of the apparatus. Generally, the frequency of the switch LS can be lowered to about 200 Hz.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A high-frequency arc welding apparatus comprising:
   a welding machine having an inductive component;
   high-frequency switching means connected in series with the welding machine;
   means for connecting the series circuit of the high-frequency switching means and the welding machine across two terminals of a D.C. voltage source to form a closed circuit for conducting welding current;
   a first rectifier;
   a condenser connected in series with the first rectifier;
   means for connecting the series circuit of the first rectifier and the condenser between one terminal of the D.C. voltage source and the junction of the welding machine and the high-frequency switching means to form a closed circuit for the transfer of electrical energy stored in the inductive component of the welding machine to the condenser;
   an inductor;
   low-frequency switching means connected in series with the inductor;
   means for connecting the series circuit of the low-frequency switching means and the inductor between the other terminal of the D.C. voltage source and the junction of the condenser and the rectifier to form a closed circuit for the discharge of electrical energy stored in the condenser;
   a second rectifier; and
   means for connecting the second rectifier between the one terminal of the D.C. voltage source and the junction of the low-frequency switching means and the inductor to form a closed circuit for regenerating in the D.C. voltage source electrical energy stored in the inductor.

2. The high-frequency arc welding apparatus recited in claim 1, wherein:
   the first and second rectifiers are diodes.

3. The high-frequency arc welding apparatus recited in claim 1, wherein:
   the switching frequency of the low-frequency switching means is less than 600 Hz.

4. A high-frequency arc welding apparatus comprising:
   a first D.C. voltage source;
   a welding machine having an inductive component;
   high-frequency switching means connected in series with the welding machine;
   the series circuit of the high-frequency switching means and the welding machine being connected across the two terminals of the first D.C. voltage source to form a closed circuit for conducting welding current;
   a first rectifier;
   a second D.C. voltage source connected in series with the first rectifier;
   the series circuit of the first rectifier and the second D.C. voltage source being connected between one terminal of the first D.C. voltage source and the junction of the welding machine and a high-frequency switching means to form a closed circuit for the transfer of electrical energy stored in the inductive component of the welding machine to the second D.C. voltage source;
   an inductor;

low-frequency switching means connected in series with the inductor;

the series circuit of the low-frequency switching means and the inductor being connected between the other terminal of the first D.C. voltage source and the junction of the second D.C. voltage source and the rectifier to form a closed circuit for the discharge of electrical energy stored in the second D.C. voltage source; and a second rectifier being connected between the one terminal of the first D.C. voltage source and the junction of the low-frequency switching means and the inductor to form a closed circuit for regenerating in the first D.C. voltage source electrical energy stored in the inductor.

5. The high-frequency arc welding apparatus recited in claim 4, wherein:

the first and second rectifiers are diodes.

6. The high-frequency arc welding apparatus recited in claim 4, wherein:

the switching frequency of the low-frequency switching means is less than 600 Hz.

* * * * *